(12) United States Patent
Hiramatsu

(10) Patent No.: US 10,787,173 B2
(45) Date of Patent: Sep. 29, 2020

(54) TRAVELING ASSISTANCE METHOD AND DRIVING CONTROL DEVICE

(71) Applicant: Nissan Motor Co., Ltd., Yokohama-shi, Kanagawa (JP)

(72) Inventor: Machiko Hiramatsu, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/491,033

(22) PCT Filed: Mar. 7, 2017

(86) PCT No.: PCT/JP2017/009021
§ 371 (c)(1),
(2) Date: Sep. 4, 2019

(87) PCT Pub. No.: WO2018/163288
PCT Pub. Date: Sep. 13, 2018

(65) Prior Publication Data
US 2020/0122724 A1    Apr. 23, 2020

(51) Int. Cl.
*B60W 30/18* (2012.01)
*B60W 60/00* (2020.01)
*B60T 8/174* (2006.01)
*B60W 50/10* (2012.01)
(Continued)

(52) U.S. Cl.
CPC .......... *B60W 30/181* (2013.01); *B60T 8/174* (2013.01); *B60W 30/18154* (2013.01); *B60W 50/10* (2013.01); *B60W 60/001* (2020.02); *B60W 60/0051* (2020.02); *G05D 1/0061* (2013.01); *G05D 1/0088* (2013.01); *B60W 30/18109* (2013.01); *B60W 2050/0077* (2013.01); *B60W 2050/0088* (2013.01); *B60W 2540/10* (2013.01); *B60W 2540/12* (2013.01); *B60W 2552/10* (2020.02); *B60W 2552/15* (2020.02); *B60W 2552/30* (2020.02); *B60W 2554/4041* (2020.02); *B60W 2555/20* (2020.02);
(Continued)

(58) Field of Classification Search
CPC ............ B60W 30/181; B60W 60/001; B60W 60/0051; B60W 2555/00; B60T 8/174; G05D 1/0061; G05D 2201/0213
USPC ............................................ 701/23, 24, 300
See application file for complete search history.

(56) References Cited

U.S. PATENT DOCUMENTS 5,278,764 A * 1/1994 Iizuka .................. B60T 13/662
180/170
2007/0198145 A1    8/2007 Norris et al.
(Continued)

FOREIGN PATENT DOCUMENTS

| EP | 2848484 A2 | 3/2015 |
| EP | 3466789 A1 | 4/2019 |
| JP | H05-294218 A | 11/1993 |

(Continued)

*Primary Examiner* — Isaac G Smith
(74) *Attorney, Agent, or Firm* — Young Basile Hanlon & MacFarlane, P.C.

(57) ABSTRACT

A traveling assistance method of the present invention for a vehicle capable of switching between manual driving by the driver and automated driving includes learning a braking distance of a case of stopping at an intersection during the manual driving by the driver, in which a braking distance of a case of no preceding vehicle in front of the vehicle is preferentially learned.

24 Claims, 9 Drawing Sheets

(51) Int. Cl.
  *G05D 1/00* (2006.01)
  *B60W 50/00* (2006.01)
(52) U.S. Cl.
  CPC ..... *B60W 2555/60* (2020.02); *B60W 2710/18* (2013.01); *G05D 2201/0213* (2013.01)

(56) References Cited

U.S. PATENT DOCUMENTS

2014/0015663 A1    1/2014  Uno
2017/0369052 A1*  12/2017  Nagy ................... B60W 40/09

FOREIGN PATENT DOCUMENTS

| JP | 2007-62604 A   | 3/2007 |
| JP | 2008-105511 A  | 5/2008 |
| JP | 2011-98690 A   | 5/2011 |
| JP | 2015-002583 A  | 1/2015 |
| JP | 2015-89801 A   | 5/2015 |
| JP | 2015-99406 A   | 5/2015 |

* cited by examiner

FIG. 3

| BRAKING DISTANCE Db | DECELERATION STARTING SPEED Vb | x1 | x2 | x3 | x4 | x5 | x6 |
|---|---|---|---|---|---|---|---|
| 18.44713 | 10.2 | 0 | 0 | 0 | 1 | 0 | 0 |
| 15.85535 | 8.972222 | 0 | 0 | 0 | 1 | 0 | 0 |
| 13.88197 | 7.827778 | 0 | 0 | 0 | 1 | 0 | 0 |
| 9.694338 | 5.547222 | 0 | 0 | 0 | 1 | 0 | 0 |
| 7.775191 | 4.391667 | 0 | 0 | 0 | 1 | 0 | 0 |
| 2.965726 | 0 | 0 | 0 | 0 | 1 | 0 | 1 |
| 11.97936 | 6.127778 | 0 | 0 | 0 | 0 | 0 | 1 |
| 10.5132 | 5.586111 | 0 | 0 | 0 | 0 | 0 | 1 |
| 9.87951 | 4.997222 | 0 | 0 | 0 | 0 | 0 | 1 |
| 9.232326 | 4.447222 | 1 | 0 | 1 | 1 | 0 | 0 |
| 15.77443 | 8.875 | 1 | 0 | 1 | 1 | 0 | 0 |
| 13.98813 | 7.947222 | 1 | 0 | 1 | 1 | 0 | 0 |
| 12.41838 | 6.866667 | 1 | 0 | 1 | 1 | 0 | 0 |
| 10.59575 | 5.741667 | 1 | 0 | 1 | 1 | 0 | 0 |
| 9.087317 | 4.672222 | 1 | 0 | 1 | 1 | 0 | 0 |

FIG. 5

| | COEFFICIENT | ENVIRONMENT FACTOR | TERM | DESCRIPTION |
|---|---|---|---|---|
| RATE OF DECELERATION (m/s²) | c0 | REFERENCE VALUE OF INDIVIDUAL | | AVERAGE VALUE OF INDIVIDUAL WHEN X1 TO X6 = 0 |
| | c1 | CURVED ROAD | x1 | 1: ROAD CURVATURE IS EQUAL TO OR GREATER THAN PREDETERMINED VALUE, 0: ROAD CURVATURE IS SMALLER THAN PREDETERMINED VALUE |
| | c2 | GRADE | x2 | 1: DOWNHILL, 0: OTHER |
| | c3 | TRAFFIC LIGHT | x3 | 1: RED LIGHT, 0: OTHER |
| | c4 | NIGHT | x4 | 1: HEADLIGHTS ARE LIGHTED, 0: HEADLIGHTS ARE NOT LIGHTED |
| | c5 | WEATHER | x5 | 1: BAD WEATHER, 0: OTHER |
| | c6 | TURNING RIGHT OR LEFT | x6 | 1: DIRECTION INDICATOR IS ON, 0: OFF |
| TTI (S) | d | DEGREE OF DEPENDENCE ON TTI | | VALUE BECOMES CLOSER TO 1 AS DEGREE OF DEPENDENCE ON TTI IS GREATER |

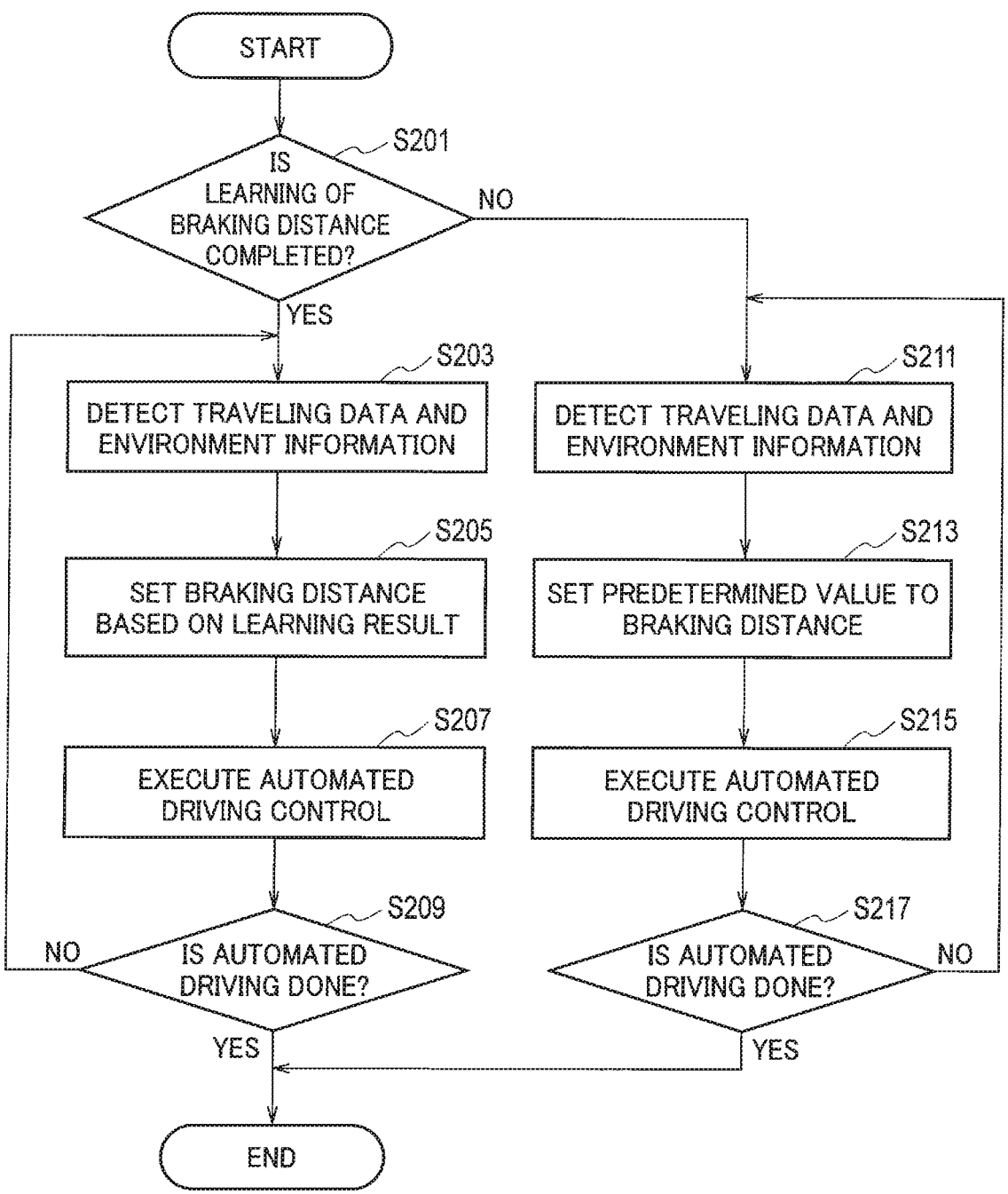

TRAVELING ASSISTANCE METHOD AND DRIVING CONTROL DEVICE

TECHNICAL FIELD

The present invention is for a vehicle capable of switching between manual driving by the driver and automated driving and relates to a traveling assistance method that includes learning traveling data during the manual driving by the driver and a driving control device that applies the learning result to traveling properties of the automated driving.

BACKGROUND

Conventionally, in order to enable reduction of strangeness that the driver feels during the automated driving, a driving control device that learns driving operations of the manual driving by the driver has been disclosed as Japanese Patent Application Publication No. 2015-89801. With the driving control device disclosed in Patent Literature 1, environment items such as the number of lanes and weather are set, and during the manual driving, driving environments are specified based on the environment items, and the driving operations by the driver are learned while being associated with the driving environment.

SUMMARY

However, in learning a braking distance of a case where a vehicle stops at an intersection of a general road, traveling data has great variation even under the same environment condition; thus, there has been a problem that accurate learning of a braking distance that is based on the sensation of the driver cannot be performed.

The present invention is proposed in view of the above-described actual circumstances, and an object thereof is to provide a traveling assistance method and a driving control device that enable accurate learning of a braking distance that is based on the sensation of the driver.

In order to solve the above-described problem, with a traveling assistance method and a driving control device according to an aspect of the present invention, a braking distance of a case of stopping at an intersection during manual driving by the driver is learned, and a braking distance of a case of no preceding vehicle in front of the vehicle is preferentially learned.

According to the present invention, it is possible to accurately learn a braking distance that is based on the sensation of the driver.

BRIEF DESCRIPTION OF THE DRAWINGS

FIG. 3 is a diagram that illustrates an example of data inputted by the traveling property learning processing according to the embodiment of the present invention;

FIG. 5 is a diagram for describing coefficients of a multiple regression analysis executed in the traveling property learning processing according to the embodiment of the present invention;

FIG. 13 is a flowchart that illustrates a processing procedure of automated driving control processing by the driving control device according to the embodiment of the present invention.

DETAILED DESCRIPTION

Hereinafter, an embodiment to which the present invention is applied is described with reference to the drawings.

[Configuration of Driving Control System]

Figure 1:
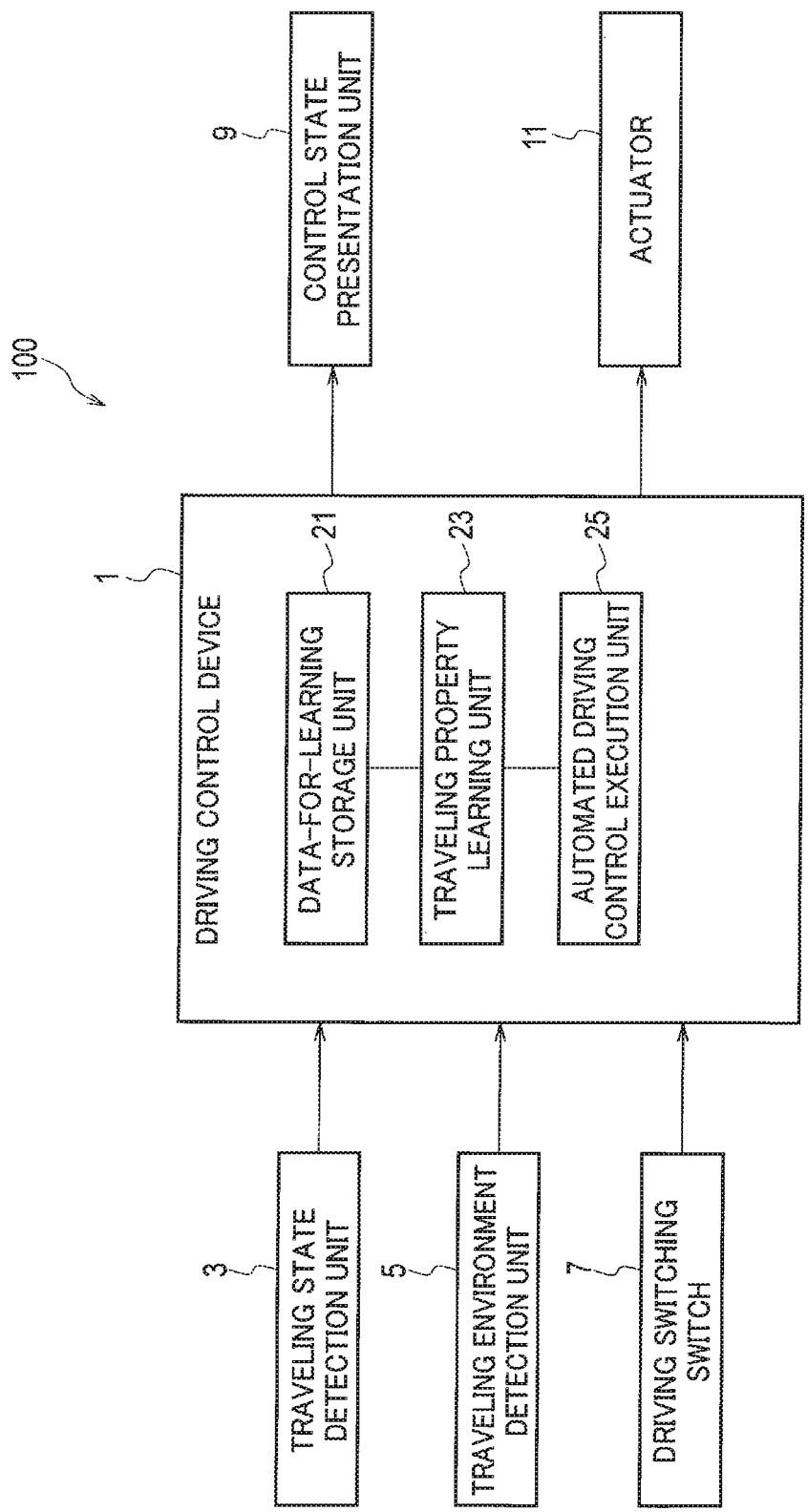
FIG. 1 is a block diagram that illustrates a configuration of a driving control system including a driving control device according to an embodiment of the present invention.

FIG. 1 is a block diagram that illustrates a configuration of a driving control system including a driving control device according to this embodiment. As illustrated in FIG. 1, a driving control system 100 according to this embodiment includes a driving control device 1, a traveling state detection unit 3, a traveling environment detection unit 5, a driving switching switch 7, and a control state presentation unit 9. In addition, the driving control system 100 is connected to an actuator 11 mounted in a vehicle.

The driving control device 1 is a controller in the vehicle capable of switching between manual driving by the driver and automated driving, which learns traveling data during the manual driving by the driver and executes processing of applying the learning result to traveling properties of the automated driving. Specifically, the driving control device 1 preferentially uses traveling data of a case of no preceding vehicle traveling in front of the vehicle to execute traveling property learning processing for learning a braking distance of a case where the vehicle stops at an intersection. In this traveling property learning processing, the traveling data of the case of no preceding vehicle is selected from pieces of traveling data during the manual driving, and the selected traveling data of the case of no preceding vehicle is used for the learning. That is, only the traveling data of the case of no preceding vehicle is used for the learning. In this case, the driving control device 1 includes a data-for-learning storage unit 21, a traveling property learning unit 23, and an automated driving control execution unit 25.

In this embodiment, a case where the driving control device 1 is mounted in the vehicle; however, a communication device may be arranged in the vehicle, and a part of the driving control device 1 may be arranged in an external server to execute the traveling property learning processing. In the case where the driving control device 1 is mounted in the vehicle, it is possible to learn the traveling properties of the driver owning or using the vehicle. Then, it is possible to store the traveling data of a predetermined period of time (for example, the latest one month) and reflect the traveling data to the automated driving of the vehicle owned or used by the driver. On the other hand, in the case where the driving control device 1 is arranged in the external server, it is possible to calculate more stable learning results since the learning can be performed using the traveling data of a long period of time of the driver himself/herself. When the learning is not completed yet, it is possible to use the traveling data of other drivers and reflect the average traveling properties of the drivers in the area to the automated driving.

The traveling state detection unit 3 detects the traveling data indicating traveling states of the vehicle such as a vehicle speed and rate of acceleration, presence or absence of the preceding vehicle, current location, display state of a direction indicator, lighting state of headlights, and operation state of wipers. For example, the traveling state detection unit 3 is an in-vehicle network such as a CAN (Controller Area Network), navigation device, laser radar, camera, and the like. Specifically, the traveling state detection unit 3 detects amounts of operations of a brake pedal and an accelerator pedal of the vehicle and a speed and a rate of deceleration of the vehicle as data for detecting starting of deceleration and stopping of the vehicle.

The traveling environment detection unit 5 detects environment information that indicates an environment in which the vehicle is traveling such as the number of lanes, speed limit, road grade, road curvature, display state of a traffic light in front of the vehicle, distance to an intersection in front of the vehicle, planned course of the intersection in front of the vehicle, and presence or absence of restriction on temporary stopping of a road where the vehicle is traveling. For example, the traveling environment detection unit 5 is a camera, laser radar, or navigation device mounted in the vehicle. Note that the display state of the traffic light in front of the vehicle and the presence or absence of restriction on temporary stopping may be detected by using road-to-vehicle communication. The planned course of the intersection in front of the vehicle is obtained from the navigation device, the display state of the direction indicator, and the like. In addition, illuminance, temperature, and weather state around the vehicle are obtained from an illuminance sensor, outside temperature sensor, and wiper switch, respectively. Note that the illuminance may be obtained from a switch of the headlights.

The driving switching switch 7 is a switch that is mounted in the vehicle and manipulated by an occupant of the vehicle for switching between the automated driving and the manual driving. For example, the driving switching switch 7 is a switch arranged on a steering of the vehicle.

The control state presentation unit 9 displays whether the current control state is the manual driving or the automated driving on a meter display unit, display screen of the navigation device, head-up display, and the like. In addition, the control state presentation unit 9 outputs announcement sounds for indicating starting and ending of the automated driving and also indicates whether the learning of the traveling properties is done.

The actuator 11 receives an execution command from the driving control device 1 and drives units such as the accelerator, brake, and steering of the vehicle.

Next, units forming the driving control device 1 are described. The data-for-learning storage unit 21 obtains the traveling data on the traveling state of the vehicle from the traveling state detection unit 3 and the traveling environment detection unit 5 and the environment information on the traveling environment around the vehicle and stores the data required for the traveling property learning processing. Specifically, the data-for-learning storage unit 21 stores the traveling data of the case of no preceding vehicle that is used for the learning of the braking distance of the case of stopping at the intersection during the manual driving. In this process, the data-for-learning storage unit 21 stores the traveling data of the case of no preceding vehicle while associating it with the traveling state and the traveling environment of the vehicle. The stored traveling data is data such as a deceleration starting speed of the case where the vehicle stops at the intersection when there is no preceding vehicle and a braking distance of the case where the vehicle stops at the intersection when there is no preceding vehicle. Besides, the data-for-learning storage unit 21 stores data such as the amounts of operations of the brake pedal and the acceleration pedal of the vehicle, a speed and a rate of deceleration of the vehicle, and a distance to a stop line of the intersection. The data-for-learning storage unit 21 also stores the environment information. The environment information is the number of lanes, road curvature, speed limit, road grade, presence or absence of restriction on temporary stopping or display state of the traffic light of the road where the vehicle is traveling, display state of the direction indicator, weather, temperature, or illuminance around the vehicle, and so on.

The traveling property learning unit 23 reads the traveling data stored in the data-for-learning storage unit 21 and learns the traveling properties of the vehicle taking into consideration a degree of effects from the traveling state and the traveling environment. Specifically, the traveling property learning unit 23 preferentially uses the traveling data of the case of no preceding vehicle traveling in front of the vehicle and learns the braking distance of the case of stopping at the intersection out of the traveling properties of the vehicle. In this process, the traveling property learning unit 23 selects the traveling data of the case of no preceding vehicle from pieces of the traveling data during the manual driving and uses the selected traveling data of the case of no preceding vehicle for the learning. That is, only the traveling data of the case of no preceding vehicle is used for learning the braking distance of the case where the vehicle stops at the intersection. The traveling property learning unit 23 performs the learning taking into consideration the environment information on the environment in which the vehicle is traveling and performs the learning in every trip of the vehicle. In addition, a driving style of the driver may be determined based on the learning result of the braking distance of the case of stopping at the intersection. The thus-calculated learning result is stored in the traveling property learning unit 23 as needed.

The automated driving control execution unit 25 executes automated driving control when entering an automated driving section or when the driver selects the automated driving using the driving switching switch 7. In this process, the automated driving control execution unit 25 applies the learning result learned by the traveling property learning unit 23 to the traveling properties of the automated driving. Specifically, the learning result of the braking distance of the case of stopping at the intersection is applied to the braking distance for the automated driving.

Note that, the driving control device 1 is formed of a general-purpose electronic circuit including a microcomputer, microprocessor, and CPU and a peripheral device such as a memory. The driving control device 1 executes a specific program to operate as the above-described data-for-learning storage unit 21, traveling property learning unit 23, and automated driving control execution unit 25. Those functions of the driving control device 1 can be implemented by one or more processing circuits. The processing circuits include, for example, a programmed processing device such as a processing device including an electricity circuit and also include a device such as an application-specific integrated circuit (ASIC), which is arranged for executing the functions described in the embodiment, and a conventional circuit part.

[Procedure of Traveling Property Learning Processing]

Next, the procedure of the traveling property learning processing by the driving control device 1 according to this embodiment is described with reference to the flowchart of FIG. 2. The traveling property learning processing illustrated in FIG. 2 is started when ignition of the vehicle is turned on.

Figure 2:
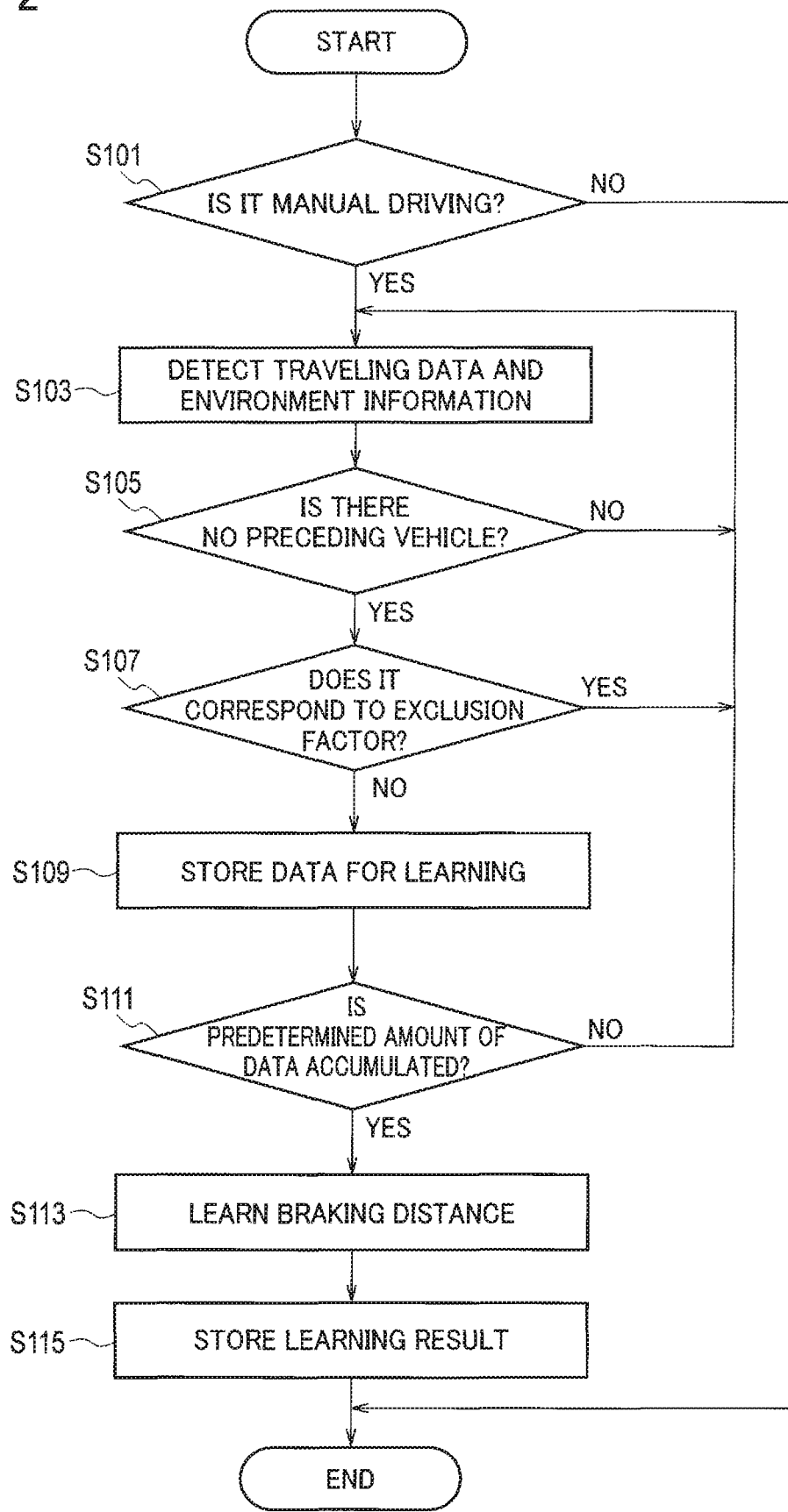
FIG. 2 is a flowchart that illustrates a processing procedure of traveling property learning processing by the driving control device according to the embodiment of the present invention.

As illustrated in FIG. 2, first, in step S101, the data-for-learning storage unit 21 determines whether the vehicle is manually driven based on the state of the driving switching switch 7. When the vehicle is manual driven, the process proceeds to step S103, and when the vehicle is automatically driven, the traveling property learning processing ends and the automated driving control is executed.

In step S103, the data-for-learning storage unit 21 detects the traveling data on the traveling state of the vehicle and the environment information on the traveling environment around the vehicle from the traveling state detection unit 3 and the traveling environment detection unit 5. A vehicle speed, steering angle, rate of acceleration, rate of deceleration, distance between the vehicle and the preceding vehicle, relative speed between the vehicle and the preceding vehicle, current location, planned course of the intersection in front of the vehicle, amounts of operations of brake pedal and accelerator pedal, lighting state of headlights, operation state of wipers, and so on are detected as the detected traveling data. The number of lanes, road curvature, speed limit, road grade, presence or absence of restriction on temporary stopping or display state of the traffic light of the road where the vehicle is traveling, distance from the vehicle to the stop line of the intersection, display state of the direction indicator of the vehicle, weather, temperature, or illuminance around the vehicle, and so on are detected as the environment information.

In step S105, the data-for-learning storage unit 21 determines whether there is no preceding vehicle traveling in front of the vehicle. As a method of determining whether there is no preceding vehicle, it may be determined that there is no preceding vehicle not only when the preceding vehicle is not detected but also when the preceding vehicle is detected but the distance between the vehicle and the preceding vehicle is equal to or greater than a predetermined value (for example, 50 m). When it is determined that there is no preceding vehicle, the process proceeds to step S107, and when it is determined that there is the preceding vehicle, the process returns to step S103.

In step S107, the data-for-learning storage unit 21 determines whether the current traveling state of the vehicle corresponds to exclusion factors. The exclusion factors are specified cases that are not suitable for obtaining the data used for the learning of the traveling property. There are two exclusion factors: (A) the maximum rate of deceleration of the case where the vehicle stops at the intersection is equal to or higher than a predetermined value (for example, 0.3 G); and (B) the deceleration starting speed of the case where the vehicle stops at the intersection is equal to or lower than a predetermined value (for example, 10 km/h). When the current traveling state of the vehicle does not correspond to these exclusion factors, the data-for-learning storage unit 21 allows the process to proceed to step S109, and when the current traveling state of the vehicle corresponds to these exclusion factors, the process returns to step S103.

As described above, application of the exclusion factor (A) makes it possible to exclude data of a case of unexpected sudden braking, and application of the exclusion factor (B) makes it possible to exclude data of, for example, extremely low speed after driving off while creeping. Thus, setting of these exclusion factors (A) and (B) makes it possible to obtain the traveling data of a case of normal deceleration state. Note that these exclusion factors are not necessarily applied, and there may be a case of not applying these exclusion factors depending on the situation.

In step S109, the data-for-learning storage unit 21 stores the traveling data and the environment information, which are detected in step S103 and selected by the processing in steps S105 and 107, as data for learning. Note that, although the case of storing the data that is selected in advance is described in this embodiment, the data may be selected by executing the processing of the above-described steps S105 and 107 after once storing all pieces of the data during the manual driving.

Figure 4:
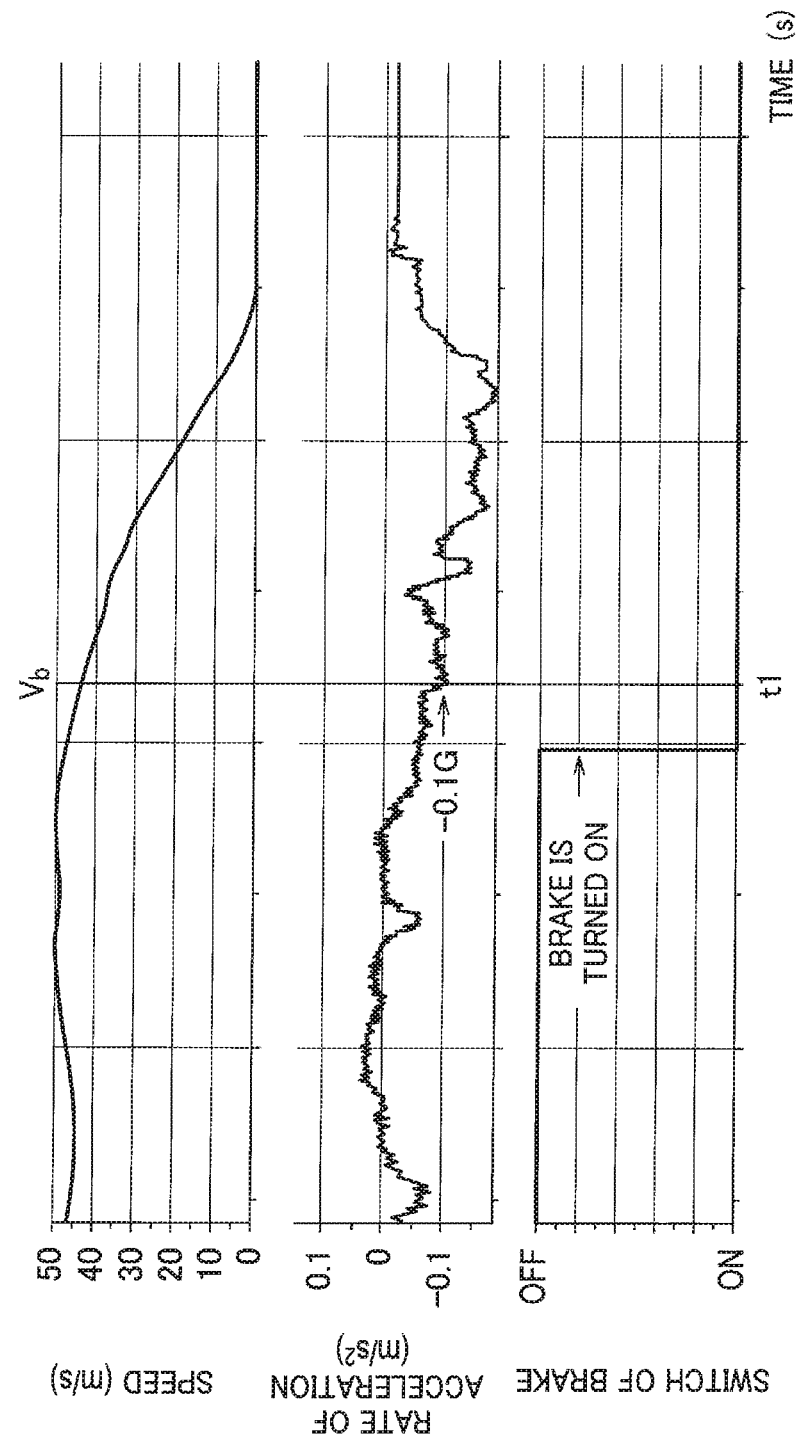
FIG. 4 is a diagram for describing a deceleration starting speed and a braking distance of a case where a vehicle stops at an intersection.

Now, an example of the data for learning that is stored in the data-for-learning storage unit 21 is illustrated in FIG. 3. As illustrated in FIG. 3, braking distance Db, deceleration starting speed Vb, data of x1 to x6 are stored as the data for learning. The braking distance Db is a braking distance of the case where the vehicle stops at the intersection when there is no preceding vehicle and is a traveling distance from a time point t1 at which the deceleration is started to a time point at which the speed becomes zero as illustrated in FIG. 4. The deceleration starting speed Vb is the deceleration starting speed of the case where the vehicle stops at the intersection when there is no preceding vehicle. As illustrated in FIG. 4, the deceleration starts at the time point t1 at which the rate of acceleration of the vehicle becomes equal to or lower than −0.1 G (the rate of deceleration becomes equal to or higher than 0.1 G) after the braking switch is turned on by starting braking, and the speed at the time point t1 is defined as the deceleration starting speed Vb. If the starting of deceleration is set at the time point t1 at which the rate of acceleration becomes equal to or lower than the predetermined value as described above, it is possible to exclude a reaction distance and extract timing of the starting of deceleration that is intended by the driver. The rate of acceleration may be obtained by filtering an output value of a sensor of the rate of acceleration or may be obtained based on a derivative value of the speed. In addition, an inflection point of the speed may be set as a deceleration starting point by approximating the speed by a sigmoid function or a logistic function.

x1 to x6 are pieces of data that are set based on the environment information and are each set to a value 0 or 1 in accordance with the setting method illustrated in FIG. 5.

For example, once the data of the braking distance Db and the deceleration starting speed Vb illustrated in FIG. 3 are obtained, x1 is set to 1 when the curvature of the road where the vehicle is traveling is equal to or greater than a predetermined value, and x1 is set to 0 when the curvature is smaller than the predetermined value. The speed limit may be applied instead of the road curvature. For example, x1 is set to 1 when the speed limit of the road where the vehicle is traveling is equal to or greater than a predetermined value (40 or 50 km/h), and x1 is set to 0 when the speed limit is smaller than the predetermined value.

In addition, x2 is set to 1 when the vehicle is traveling downhill and is set to 0 for other cases (flat road and uphill), and x3 is set to 1 when the traffic light in front of the vehicle is a red light and is set to 0 for other cases (green light or no traffic light). Note that the red light may include yellow light. x4 is set to 1 when it is night and is set to 0 for other cases. Determination as to whether it is night may be made based on the lighting state of the headlights. In addition, x5 is set to 1 when the weather around the vehicle is bad weather and is set to 0 when it is not bad weather. For determination as to whether it is bad weather, it is determined as not bad weather when the wipers of the vehicle are set to OFF or intermittent, and it is determined as bad weather when the wipers of the vehicle are set to ON. In this process, conditions such as the temperature and illuminance may be added. For the case of applying the temperature as the condition, x5 is set to 1 when the temperature measured by the outside temperature sensor is minus and is set to 0 when the temperature measured by the outside temperature sensor is plus. This makes it possible to respond to different properties of icy roads. For the case of applying the illuminance as the condition, x5 is set to 1 when the illuminance sensor detects that it is bright and is set to 0 when the illuminance sensor detects that it is dark. The setting may be made based on whether the headlights are lighted, instead of based on the illuminance sensor. x6 is set to 1 when the direction indicator is ON for turning the vehicle right or left and is set to 0 when the direction indicator is OFF.

Note that, although the case of classifying the data into two levels of 0 and 1 is described in FIG. 5, the data may be classified into 3 or more levels. As described above, in the data for learning illustrated in FIG. 3, the environment information of x1 to x6 are associated with the traveling data of the braking distance Db and the deceleration starting speed Vb. Thus, in this embodiment, the traveling properties are learned by using the traveling data of the braking distance Db and the deceleration starting speed Vb, and additionally, the traveling properties are learned while associating the environment in which the vehicle is traveling with the braking distance.

Figure 6:
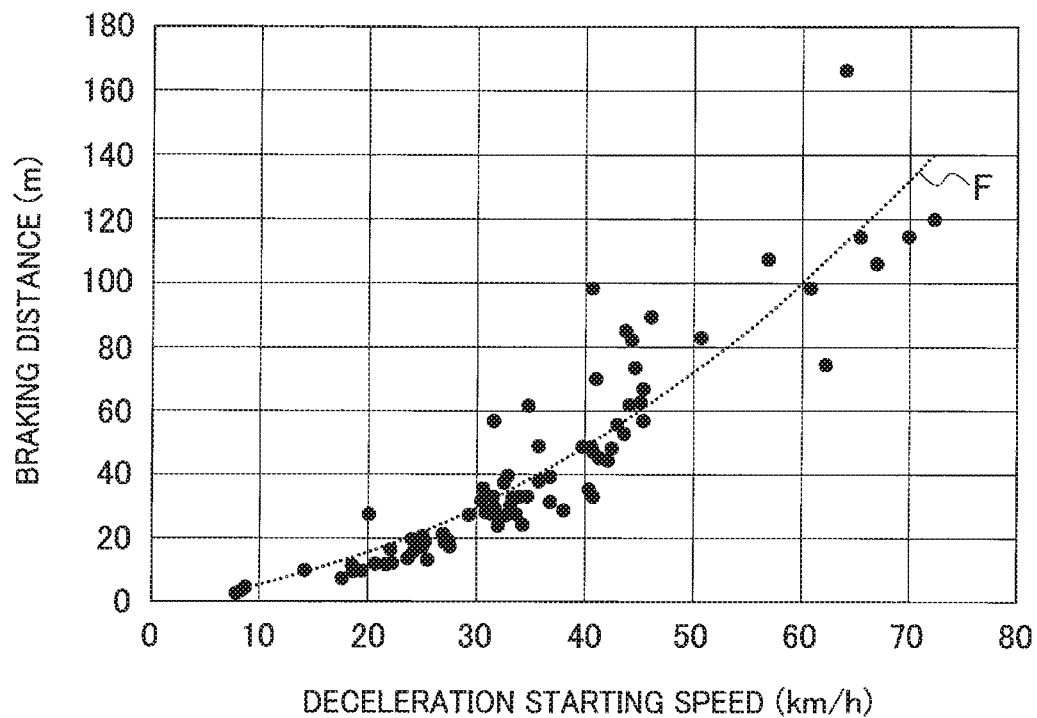
FIG. 6 is a diagram that illustrates an example of data that indicates a relationship of the deceleration starting speed and the braking distance of a case of no preceding vehicle.
Figure 7:
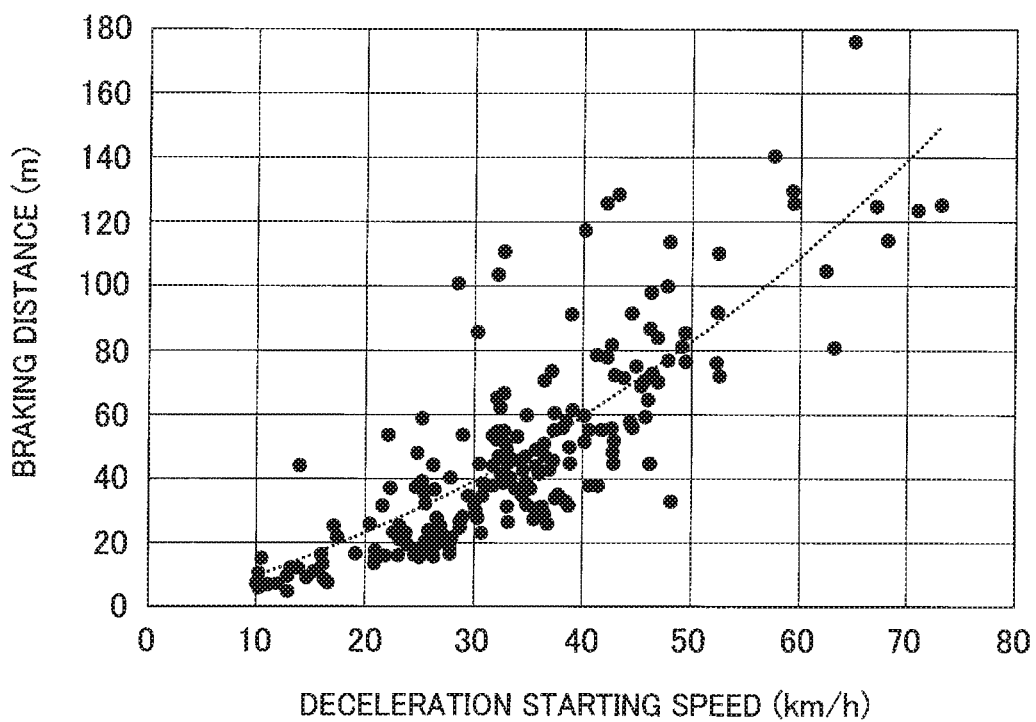
FIG. 7 is a diagram that illustrates an example of data that indicates a relationship of the deceleration starting speed and the braking distance of not only the case of no preceding vehicle but all the cases.

Since the data stored as the data for learning is selected by the processing in the above-described steps S105 and 107, variation of the data is reduced. FIG. 6 illustrates an example of data that indicates a relationship of the deceleration starting speed and the braking distance of the case of no preceding vehicle. On the other hand, FIG. 7 illustrates an example of data that indicates a relationship of the deceleration starting speed and the braking distance of not only the case of not executing the processing in step S105, or the case of no preceding vehicle, but also the case where there is the preceding vehicle. As seen from FIG. 7, when the selected data is not limited to the data of the case of no preceding vehicle, the data is varied widely because the driver depends on deceleration of the preceding vehicle. Thus, the accuracy of the learning cannot be improved by learning the relationship of the deceleration starting speed and the braking distance in this case. In contrast, when the selected data is limited to the data of the case of no preceding vehicle, the variation of the data is reduced as illustrated in FIG. 6 because the driver brakes without depending on the preceding vehicle. Thus, when the selected data is limited to the data of the case of no preceding vehicle, it is possible to accurately learn the braking distance that is based on the sensation of the driver and to improve the accuracy of the learning.

In step S111, the data-for-learning storage unit 21 determines whether a predetermined amount of the data for learning is stored, and when the amount does not reach the predetermined amount, the process returns to step S103, and when the data for learning is accumulated to be equal to or greater than the predetermined amount, the process proceeds to step S113.

In step S113, the traveling property learning unit 23 learns the traveling properties of the vehicle. Specifically, the traveling property learning unit 23 uses the traveling data of the case of no preceding vehicle traveling in front of the vehicle to learn the braking distance of the case where the vehicle stops at the intersection out of the traveling properties. In the learning of the braking distance, for example, the learning is performed by creating a multiple regression model expressed by the following equation (1) using datasets illustrated in FIG. 3:

[Math. 1]

$$Db=(c0+c1x1+c2x2+c3x3+c4x4+c5x5+c6x6)Vb^2+dVb \qquad (1),$$

where

Vb is the deceleration starting speed, Db is the braking distance calculated based on the model, x1 to c6 are environment factors, and c0 to c6 and d are coefficients obtained from the learning. The multiple regression model expressed by the above equation (1) indicates that the braking distance of the case where the vehicle stops at the intersection is varied depending on the environment factors.

The multiple regression model expressed by the equation (1) may respond to different types of deceleration starting behavior. As indicated below, the equation (1) may be expressed as the equation (2), and the equation (3) may be expressed based on the equation (1) and the equation (2):

[Math. 2]

$$Db=Vb^2/2a+dVb \qquad (2);$$

and

[Math. 3]

$$a=1/2(c0+c1x1+c2x2+c3x3+c4x4+c5x5+c6x6) \qquad (3),$$

where in the equations (2) and (3), a is an average rate of deceleration (m/s$^2$), and in the equations (1) and (2), d is TTI (Time to intersection: reaching time to the intersection of a case of assuming that the vehicle moves with the same speed as the speed at the start of braking).

Figure 8:
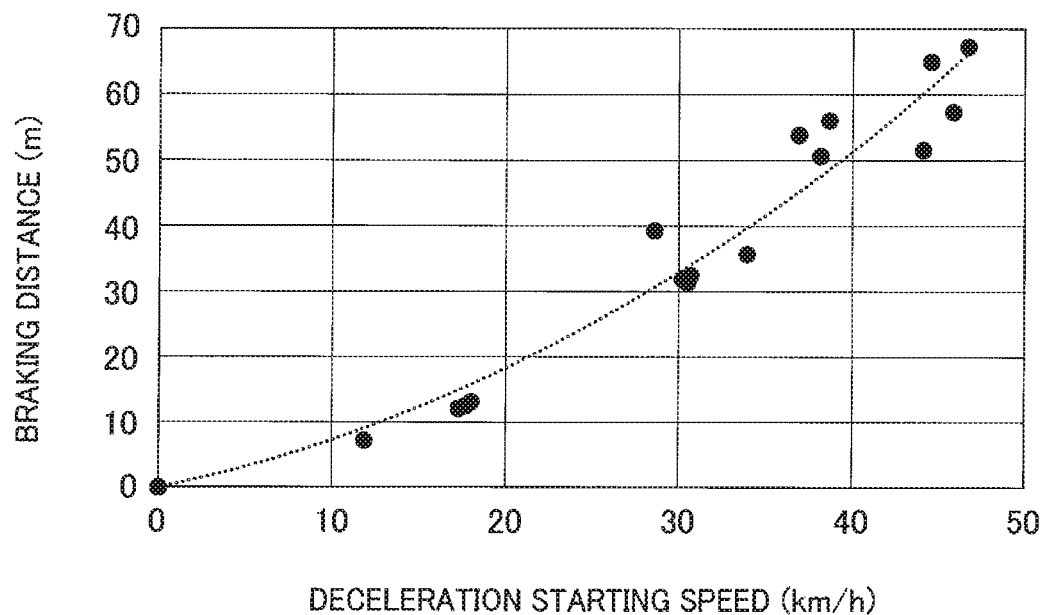
FIG. 8 is a diagram that illustrates an example of data that indicates a relationship of the deceleration starting speed and the braking distance of a case where the type of the driver is to start braking so as to make an average rate of deceleration constant.
Figure 9:
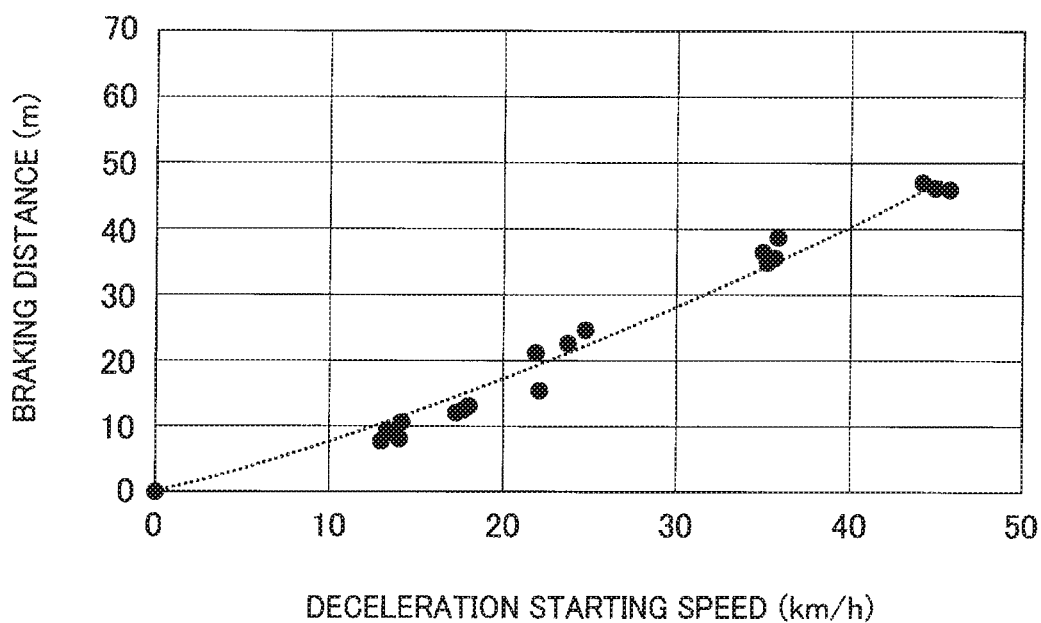
FIG. 9 is a diagram that illustrates an example of data that indicates a relationship of the deceleration starting speed and the braking distance of a case where the type of the driver is to start braking so as to make TTI (Time to intersection) constant.

The type of the deceleration starting behavior is different depending on drivers; for example, there are a type to start the braking so as to make the average rate of deceleration substantially constant regardless of the speed as illustrated in FIG. 8, and a type to start the braking so as to make the TTI substantially constant (that is, so as to make the rate of deceleration higher as the speed is higher) as illustrated in FIG. 9. The former type has a greater coefficient of $Vb^2$, and the latter type has a greater coefficient of Vb in the equation (1). The former type tends to have a lower average rate of deceleration and a longer braking distance than the latter type. Note that FIGS. 8 and 9 show an extreme example, and there may also be a driver who takes the middle behavior. The multiple regression model of the equation (1) is a model that can respond to environment factors and different types of the individual deceleration behaviors using the coefficients of $Vb^2$ and Vb.

Among the coefficients in the equation (1), c0 and d are reference values that are set for the individual drivers as illustrated in FIG. 5. c0 is an average value of the rate of deceleration of a case where values of x1 to x6 are 0, and d is a degree of dependence on the TTI (that is, a degree of changing of the rate of deceleration according to the speed). d becomes a value closer to 1 as the dependence on the TTI is higher.

The traveling property learning unit 23 performs the multiple regression analysis using the data for learning illustrated in FIG. 3 to calculate the coefficients of c0 to c6 in the equation (1). Since the data for learning used in this process is only the traveling data of the case of no preceding vehicle as illustrated in FIG. 6, the variation is reduced. As a result, the braking distance Db of the case of stopping at the intersection calculated from the equation (1) is formed in a quadratic curve F in FIG. 6. As described above, in this embodiment, the braking distance of the case of stopping at the intersection is learned with the quadratic curve using only the traveling data of the case of no preceding vehicle. This makes it possible to accurately learn the braking distance that is based on the sensation of the driver.

As expressed by the equation (1), in this embodiment, it is possible to perform the learning considering the environment information on the environment in which the vehicle is traveling by using the terms of c1x1 to c6x6. That is, it is possible to correct the braking distance based on the environment information. The terms of c1x1 to c6x6 in this embodiment are the coefficient of $Vb^2$; however, they may be the coefficient of Vb.

Note that, as the data for learning, data of multiple trips may be used, or data of only one trip may be used. When an enough amount of the data on the environment factors cannot be obtained from only one trip, the coefficients of the environment factors may be calculated using the data for learning of multiple trips, and the coefficient of c0 as the reference may be calculated using the data for learning in a trip. In this case, it is possible to provide a natural learning result even when the trip of the day tends to be performed more carefully or tends to be more in a hurry than trips of other days.

The braking distance may have different properties in the respective trips. For example, when there is a fellow passenger or load, the driving may be careful to take into consideration the fellow passenger or load and the braking distance may be longer by reducing the rate of deceleration. When the driver hurries to the destination, the driving tends to be aggressive and the braking distance may be shorter to allow for the high rate of deceleration. Like this, the allowable rate of deceleration and braking distance may be different depending on feelings and conditions during the driving. If the multiple regression analysis is performed in every trip, it is possible to obtain the properties of the braking distance of the respective trips. In addition, if the braking distance for the automated driving is controlled with the properties of the braking distance learned from the respective trips, it is possible to provide the automated driving control that corresponds to the feelings of the driver and conditions during the trip.

When the road where the vehicle is traveling is curved, x1 in the equation (1) is set to 1, and thus the braking distance Db in the equation (1) becomes a greater value than that of a case where the road is not curved. Thus, when the road where the vehicle is traveling is curved, the braking distance Db is corrected to be longer than that of the case where the road is not curved. A case of higher speed limit may be used instead of the case of the curved road. When the speed limit of the road where the vehicle is traveling is equal to or greater than a predetermined value, the braking distance Db is corrected to be longer than that of a case where the speed limit is smaller than the predetermined value.

Likewise, when the vehicle is traveling downhill, x2 in the equation (1) is set to 1, and thus the braking distance Db in the equation (1) becomes a greater value than that of a case of traveling uphill. Thus, when the vehicle is traveling downhill, the braking distance Db is corrected to be longer than that of the case of traveling uphill.

When the traffic light in front of the vehicle is the red light, x3 in the equation (1) is set to 1, and thus the braking distance Db in the equation (1) becomes a greater value than that of a case where the traffic light is other than the red light. Thus, when the traffic light in front of the vehicle is the red light, the braking distance Db is corrected to be longer than that of the case where the traffic light is other than the red light.

In addition, when the vehicle is traveling at night, x4 in the equation (1) is set to 1, and thus the braking distance Db in the equation (1) becomes a greater value than that of a case of not at night. Thus, when the vehicle is traveling at night, the braking distance Db is corrected to be longer than that of the case of the time other than night.

When the weather around the vehicle is bad weather, x5 in the equation (1) is set to 1, and thus the braking distance Db in the equation (1) becomes a greater value than that of a case where the weather is other than bad weather. Thus, when the weather around the vehicle is bad weather, the braking distance Db is corrected to be longer than that of the case of not bad weather.

In addition, when the direction indicator is ON and the vehicle turns right or left, x6 in the equation (1) is set to 1, and thus the braking distance Db in the equation (1) becomes a greater value than that of a case where the direction indicator is OFF and the vehicle does not turn right or left. Thus, when the vehicle turns right or left, the braking distance Db may be corrected to be longer than that of the case of not turning right or left.

Figure 10:
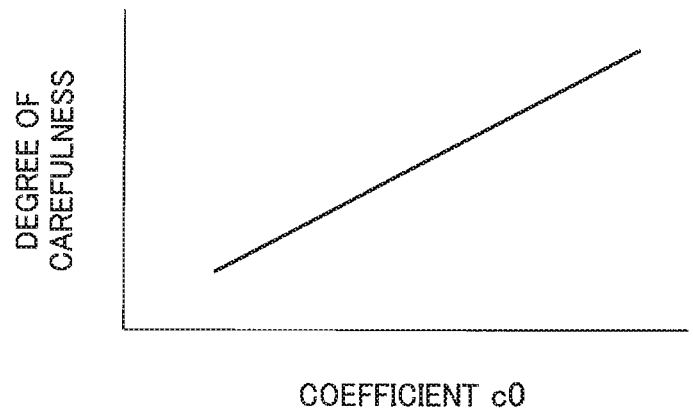
FIG. 10 is a diagram for describing a method of determining a degree of carefulness by the traveling property learning processing according to the embodiment of the present invention.
Figure 11:
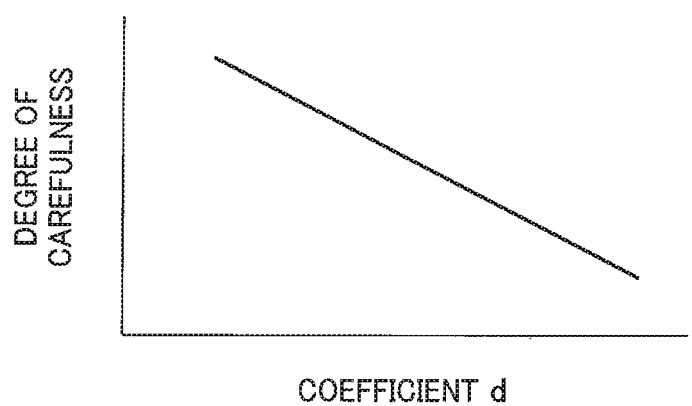
FIG. 11 is a diagram for describing the method of determining the degree of carefulness by the traveling property learning processing according to the embodiment of the present invention.

In addition to the above-described learning of the traveling properties, the traveling property learning unit 23 may determine the driving style of the driver based on the learning result of the braking distance. The properties of the braking distance may indicate the tendency that corresponds to the driving style of the individual driver. For example, the coefficient c0 of $Vb^2$ in the equation (1) reflects the degree of carefulness of the driver, and the degree of carefulness becomes higher as the value of c0 is higher as illustrated in FIG. 10. That is, since the average rate of deceleration is low and the braking distance is long when the driver has greater c0 (degree of carefulness is greater), the deceleration is started earlier for the intersection, and it can be determined that the driver is careful. FIG. 10 illustrates that, the greater the coefficient c0, the greater the degree of carefulness.

Since the coefficient d of Vb tends to be smaller as c0 is greater, it may be determined that, the smaller the value of d, the greater the degree of carefulness, as illustrated in FIG.

Figure 12:
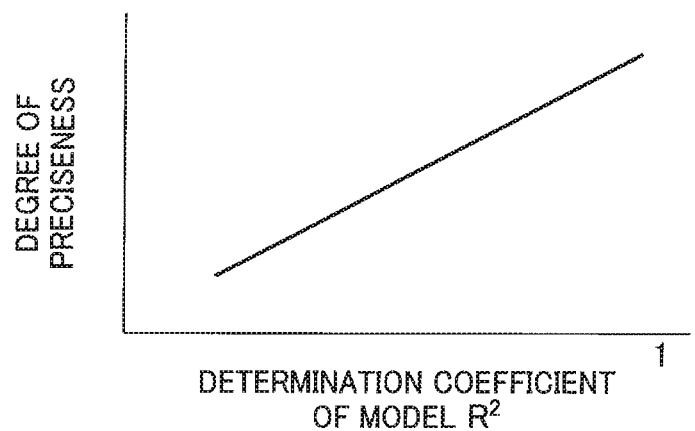
FIG. 12 is a diagram for describing a method of determining a degree of preciseness by the traveling property learning processing according to the embodiment of the present invention.

11. It is also possible to determine the degree of preciseness of the driver by using a determination coefficient $R^2$ of the multiple regression model as illustrated in FIG. 12. The determination coefficient is a value that indicates a degree of fitting to the multiple regression model, and the variation of the data is less and the data fits the model more as the determination coefficient is closer to 1. That is, it can be considered that the braking distance is always constant as the determination coefficient is greater, and it can be determined that the driver is precise person. The individual driving style determined in this way may be provided to the driver himself/herself, or may be provided as information to the driver or a manager by comparing the determined driving style with that of other drivers using the external server and determining how much the driver is precise among all the drivers.

In step S115, the traveling property learning unit 23 stores the coefficients of c0 to c6 in the calculated equation (1) as the learning result and ends the traveling property learning processing according to this embodiment.

[Procedure of Automated Driving Control Processing]

Next, a procedure of automated driving control processing by the driving control device 1 according to this embodiment is described with reference to a flowchart of FIG. 13.

As illustrated in FIG. 13, in step S201, the automated driving control execution unit 25 determines whether the learning of the braking distance of the case of stopping at the intersection is completed by the traveling property learning processing illustrated in FIG. 2. When the learning is completed, the process proceeds to step S203, and when the learning is not completed, the process proceeds to step S211.

First, a case where the learning of the braking distance is completed is described. In step S203, the automated driving control execution unit 25 detects the traveling data on the traveling state of the vehicle and the environment information on the traveling environment around the vehicle from the traveling state detection unit 3 and the traveling environment detection unit 5.

In step S205, the automated driving control execution unit 25 sets the braking distance of the case of stopping at the intersection based on the learning result. Specifically, the automated driving control execution unit 25 sets the coefficients of c0 to c6 as the learning result in the equations (1) and (2) and calculates the braking distance Db of the case of stopping at the intersection by inputting the detected deceleration starting speed to the equation (1). The automated driving control execution unit 25 then sets the calculated braking distance Db as the braking distance that is applied to the automated driving. That is, the automated driving control execution unit 25 applies the learning result of the braking distance as the braking distance for the automated driving.

In step S207, the automated driving control execution unit 25 executes the automated driving control using the set braking distance. Specifically, the automated driving control execution unit 25 transmits a control execution command to the actuator 11 and executes operations of the accelerator, brake, steering, and the like that are required for the automated driving.

In step S209, the automated driving control execution unit 25 determines whether the automated driving is done, and when the automated driving is not done yet, the process returns to step S203 to continue the automated driving. On the other hand, when the automated driving is switched to the manual driving and the automated driving is done, the automated driving control processing according to this embodiment ends.

Next, a case where the learning of the braking distance is not completed is described. In step S211, the automated driving control execution unit 25 detects the traveling data on the traveling state of the vehicle and the environment information on the traveling environment around the vehicle from the traveling state detection unit 3 and the traveling environment detection unit 5.

In step S213, the automated driving control execution unit 25 sets the braking distance of the case of stopping at the intersection to a predetermined value that is set in advance. A general value or average value of the braking distance may be used as this predetermined value.

In step S215, the automated driving control execution unit 25 executes the automated driving control using the set braking distance. Specifically, the automated driving control execution unit 25 transmits the control execution command to the actuator 11 and executes operations of the accelerator, brake, steering, and the like that are required for the automated driving.

In step S217, the automated driving control execution unit 25 determines whether the automated driving is done, and when the automated driving is not done yet, the process returns to step S211 to continue the automated driving. On the other hand, when the automated driving is switched to the manual driving and the automated driving is done, the automated driving control processing according to this embodiment ends.

Effects of Embodiment

As described in detail above, the traveling assistance method according to this embodiment is for a vehicle capable of switching between manual driving by the driver and automated driving, in which a braking distance of a case of no preceding vehicle in front of the vehicle is preferentially learned. This prevents learning of the braking distance in the situation where the driver depends on deceleration of the preceding vehicle, and thus it is possible to accurately learn the braking distance that is based on the sensation of the driver.

In the traveling assistance method according to this embodiment, only the braking distance of the case of no preceding vehicle in front of the vehicle is learned. This enables the learning of the braking distance while excluding the situation where the driver depends on deceleration of the preceding vehicle, and thus it is possible to accurately learn the braking distance that is based on the sensation of the driver.

In addition, in the traveling assistance method according to this embodiment, the learning is performed using a deceleration starting speed of the case where the vehicle stops at the intersection when there is no preceding vehicle and a braking distance of the case where the vehicle stops at the intersection when there is no preceding vehicle. This prevents using of the traveling data on the situation where the driver depends on deceleration of the preceding vehicle, and thus it is possible to accurately learn the braking distance that is based on the sensation of the driver.

In the traveling assistance method according to this embodiment, a relationship of a deceleration starting speed of a case where the vehicle stops at the intersection when there is no preceding vehicle and a braking distance of the case where the vehicle stops at the intersection when there is no preceding vehicle is modeled in a quadratic curve. This enables accurate understanding of the relationship of the deceleration starting speed and the braking distance, and thus it is possible to accurately learn the braking distance that is based on the sensation of the driver.

In the traveling assistance method according to this embodiment, starting of deceleration of the vehicle is detected from at least one of operation of a brake pedal, operation of an accelerator pedal, and a rate of deceleration of the vehicle. This makes it possible to accurately obtain the traveling data on starting of the deceleration by the driver. Specifically, since the deceleration operation for operating the brake pedal is clear, it is possible to obtain traveling data that has the least variation. When traveling data on not operating the accelerator pedal is obtained, it is possible to obtain data that is additionally including data on a deceleration preparing behavior. In addition, when it is determined that the deceleration is started when the rate of deceleration becomes equal to or lower than a predetermined value, it is possible to detect deceleration operations of any cases.

In addition, in the traveling assistance method according to this embodiment, stopping of the vehicle is detected when a speed of the vehicle becomes equal to or lower than a predetermined value. This enables reliable detecting of the stopping of the vehicle, and it is possible to accurately learn the braking distance.

In the traveling assistance method according to this embodiment, a distance from starting of deceleration of the vehicle to a stop line of the intersection is the braking distance. This makes it possible to obtain the braking distance regardless of a location at which the vehicle actually stops.

In addition, in the traveling assistance method according to this embodiment, it is determined that there is no preceding vehicle when the preceding vehicle is not detected and when a distance between the vehicle and the preceding vehicle is equal to or greater than a predetermined value. This makes it possible to reliably obtain the traveling data of the case of no preceding vehicle.

In the traveling assistance method according to this embodiment, a braking distance that makes the maximum rate of deceleration equal to or higher than a predetermined value in the case where the vehicle stops at the intersection is not used. This enables excluding of the traveling data of the case of unexpected sudden braking, and thus it is possible to perform accurate learning using the traveling data of a stable situation.

In addition, in the traveling assistance method according to this embodiment, a braking distance that makes a deceleration starting speed equal to or lower than a predetermined value in the case where the vehicle stops at the intersection is not used. This enables excluding of the traveling data of, for example, extremely low speed after driving off while creeping, and thus it is possible to perform accurate learning using the traveling data of a stable situation.

In the traveling assistance method according to this embodiment, the learning is performed while associating an environment in which the vehicle is traveling with the braking distance. The braking distance of the case of stopping at the intersection has different properties depending on the environment conditions. Thus, it is possible to learn a braking distance reflecting the environment conditions by performing the multiple regression analysis taking into consideration the environment in which the vehicle is traveling.

In addition, in the traveling assistance method according to this embodiment, the number of lanes, road curvature, speed limit, road grade, and presence or absence of restriction on temporary stopping or display state of a traffic light of a road where the vehicle is traveling are used as the environment in which the vehicle is traveling. Moreover, a display state of a direction indicator of the vehicle and weather, temperature, or illuminance around the vehicle are used. This makes it possible to learn the braking distance individually and specifically reflecting the different environment conditions.

In the traveling assistance method according to this embodiment, when the learning result is applied to traveling properties of the automated driving, whether the vehicle is traveling downhill is determined, and when the vehicle is traveling downhill, the traveling properties are set such that the braking distance becomes longer than that of a case of traveling uphill. This enables improvement of the safety at the downhill at which the braking is difficult, and thus it is possible to provide the driver with a feeling of safety.

In addition, in the traveling assistance method according to this embodiment, when the learning result is applied to traveling properties of the automated driving, whether the vehicle turns right or left is determined, and when the vehicle turns right or left, the traveling properties are set such that the braking distance becomes longer than that of a case of not turning right or left. This enables improvement of the safety when turning right or left, and thus it is possible to provide the driver with a feeling of safety.

In the traveling assistance method according to this embodiment, when the learning result is applied to traveling properties of the automated driving, whether a traffic light in front of the vehicle is a red light is determined, and when the traffic light in front of the vehicle is the red light, the traveling properties are set such that the braking distance becomes longer than that of a case where the traffic light is other than the red light. This enables improvement of the safety when the traffic light is the red light and the vehicle has to stop, and thus it is possible to provide the driver with a feeling of safety.

In addition, in the traveling assistance method according to this embodiment, when the learning result is applied to traveling properties of the automated driving, whether a road where the vehicle is traveling is curved is determined, and when the road where the vehicle is traveling is curved, the traveling properties are set such that the braking distance becomes longer than that of a case where the road is not curved. This enables improvement of the safety at the curved road with poor visibility, and thus it is possible to provide the driver with a feeling of safety.

In the traveling assistance method according to this embodiment, when the learning result is applied to traveling properties of the automated driving, whether the vehicle is traveling at night is determined, and when the vehicle is traveling at night, the traveling properties are set such that the braking distance becomes longer than that of a case of not at night. This enables improvement of the safety at dark night with poor visibility, and thus it is possible to provide the driver with a feeling of safety.

In addition, in the traveling assistance method according to this embodiment, when the learning result is applied to traveling properties of the automated driving, whether weather around the vehicle is bad weather is determined, and when the weather around the vehicle is bad weather, the traveling properties are set such that the braking distance becomes longer than that of a case of not bad weather. This enables improvement of the safety when it is bad weather around the vehicle, and thus it is possible to provide the driver with a feeling of safety.

In the traveling assistance method according to this embodiment, when the learning result is applied to traveling properties of the automated driving, whether a speed limit of a road where the vehicle is traveling is equal to or greater than a predetermined value is determined, and when the speed limit of the road where the vehicle is traveling is equal to or greater than the predetermined value, the traveling properties are set such that the braking distance becomes longer than that of a case where the speed limit is smaller than the predetermined value. This enables improvement of the safety on a road on which the vehicle speed becomes high, and thus it is possible to provide the driver with a feeling of safety.

In addition, in the traveling assistance method according to this embodiment, a driving style of the driver is determined based on the learning result of the braking distance. This enables obtainment of a qualitative tendency of the driver, and thus it is possible to improve the safety by referring to the driving style during the manual driving.

In the traveling assistance method according to this embodiment, an external server is provided outside of the vehicle, and the braking distance is learned using the external server. This makes it possible to reduce processing loads of the vehicle.

In addition, in the traveling assistance method according to this embodiment, the learning result of the braking distance is applied to a braking distance for the automated driving of the vehicle. This enables application of the braking distance that is learned using the traveling data of the case of no preceding vehicle to the automated driving, and thus it is possible to provide automated driving that is based on the sensation of the driver.

Note that the above-described embodiment is an example of the present invention. Thus, the present invention is not limited to the above-described embodiment, and it is needless to say that the present invention can be modified to a variety of modes other than the present embodiment depending on design and the like without departing from the technical idea according to the present invention.

REFERENCE SIGNS LIST 1 driving control device
3 traveling state detection unit
5 traveling environment detection unit
7 driving switching switch
9 control state presentation unit
11 actuator
21 data-for-learning storage unit
23 traveling property learning unit
25 automated driving control execution unit
100 driving control system

The invention claimed is:

1. A traveling assistance method for a driving control device in a vehicle capable of switching between manual driving by a driver and automated driving, the driving control device learning a braking distance of a case of stopping at an intersection during the manual driving by the driver and applying the learning result to traveling properties of the automated driving of the case of stopping at the intersection, wherein
whether there is no preceding vehicle in front of the vehicle is determined, and
when it is determined that there is no preceding vehicle, the braking distance of a case of no preceding vehicle in front of the vehicle is learned.

2. The traveling assistance method according to claim 1, wherein the preceding vehicle in front of the vehicle is detected, and
when a distance between the vehicle and the preceding vehicle is equal to or greater than a predetermined value, the braking distance is learned.

3. The traveling assistance method according to claim 1, wherein only the braking distance of the case of no preceding vehicle in front of the vehicle is learned.

4. The traveling assistance method according to claim 1, wherein the learning is performed using a deceleration starting speed of a case where the vehicle stops at the intersection when there is no preceding vehicle in front of the vehicle and a braking distance of the case where the vehicle stops at the intersection when there is no preceding vehicle in front of the vehicle.

5. The traveling assistance method according to claim 1 or 2, wherein a relationship of a deceleration starting speed of a case where the vehicle stops at the intersection when there is no preceding vehicle in front of the vehicle and a braking distance of the case where the vehicle stops at the intersection when there is no preceding vehicle in front of the vehicle is learned.

6. The traveling assistance method according to claim 1, wherein starting of deceleration of the vehicle is detected from at least one of operation of a brake pedal, operation of an accelerator pedal, and a rate of deceleration of the vehicle.

7. The traveling assistance method according to claim 1, wherein stopping of the vehicle is detected when a speed of the vehicle becomes equal to or lower than a predetermined value.

8. The traveling assistance method according to claim 1, wherein a distance from starting of deceleration of the vehicle to a stop line of the intersection is the braking distance.

9. The traveling assistance method according to claim 1, wherein it is determined that there is no preceding vehicle when the preceding vehicle in front of the vehicle is not detected and when a distance between the vehicle and the preceding vehicle is equal to or greater than a predetermined value.

10. The traveling assistance method according to claim 1, wherein
a braking distance that makes the maximum rate of deceleration equal to or higher than a predetermined value in the case where the vehicle stops at the intersection is not used.

11. The traveling assistance method according to claim 1, wherein
a braking distance that makes a deceleration starting speed equal to or lower than a predetermined value in the case where the vehicle stops at the intersection is not used.

12. The traveling assistance method according to claim 1, wherein the learning is performed while associating an environment in which the vehicle is traveling with the braking distance.

13. The traveling assistance method according to claim 12, wherein
the environment in which the vehicle is traveling is at least one of the number of lanes, road curvature, speed limit, road grade, presence or absence of restriction on temporary stopping or display state of a traffic light of a road where the vehicle is traveling, display state of a direction indicator of the vehicle, and weather, temperature, or illuminance around the vehicle.

14. The traveling assistance method according to claim 1, wherein when the learning result is applied to traveling properties of the automated driving, whether the vehicle is traveling downhill is determined, and when the vehicle is traveling downhill, the traveling properties are set such that the braking distance becomes longer than that of a case of traveling uphill.

15. The traveling assistance method according to claim 1, wherein when the learning result is applied to traveling properties of the automated driving, whether the vehicle turns right or left is determined, and when the vehicle turns right or left, the traveling properties are set such that the braking distance becomes longer than that of a case of not turning right or left.

16. The traveling assistance method according to claim 1, wherein when the learning result is applied to traveling properties of the automated driving, whether a traffic light in front of the vehicle is a red light is determined, and when the traffic light in front of the vehicle is the red light, the traveling properties are set such that the braking distance becomes longer than that of a case where the traffic light is other than the red light.

17. The traveling assistance method according to claim 1, wherein when the learning result is applied to traveling properties of the automated driving, whether a road where the vehicle is traveling is curved is determined, and when the road where the vehicle is traveling is curved, the traveling properties are set such that the braking distance becomes longer than that of a case where the road is not curved.

18. The traveling assistance method according to claim 1, wherein when the learning result is applied to traveling properties of the automated driving, whether the vehicle is traveling at night is determined, and when the vehicle is traveling at night, the traveling properties are set such that the braking distance becomes longer than that of a case of not at night.

19. The traveling assistance method according to claim 1, wherein when the learning result is applied to traveling properties of the automated driving, whether weather around the vehicle is bad weather is determined, and when the weather around the vehicle is bad weather, the traveling properties are set such that the braking distance becomes longer than that of a case of not bad weather.

20. The traveling assistance method according to claim 1, wherein when the learning result is applied to traveling properties of the automated driving, whether a speed limit of a road where the vehicle is traveling is equal to or greater than a predetermined value is determined, and when the speed limit of the road where the vehicle is traveling is equal to or greater than the predetermined value, the traveling properties are set such that the braking distance becomes longer than that of a case where the speed limit is smaller than the predetermined value.

21. The traveling assistance method according to claim 1, wherein a driving style of the driver is determined based on the learning result of the braking distance.

22. The traveling assistance method according to claim 1, wherein an external server is provided outside of the vehicle, and the braking distance is learned using the external server.

23. The traveling assistance method according to claim 1, wherein the learning result of the braking distance is applied to a braking distance for the automated driving of the vehicle.

24. A driving control device in a vehicle capable of switching between manual driving by a driver and automated driving, the driving control device learning a braking distance of a case of stopping at an intersection during the manual driving by the driver and applying the learning result to traveling properties of the automated driving of the case of stopping at the intersection, wherein whether there is no preceding vehicle in front of the vehicle is determined, and when it is determined that there is no preceding vehicle, the braking distance of a case of no preceding vehicle in front of the vehicle is learned.

* * * * *